Sept. 1, 1953 W. W. GEILING 2,650,533
ROW MARKER
Filed Oct. 16, 1951
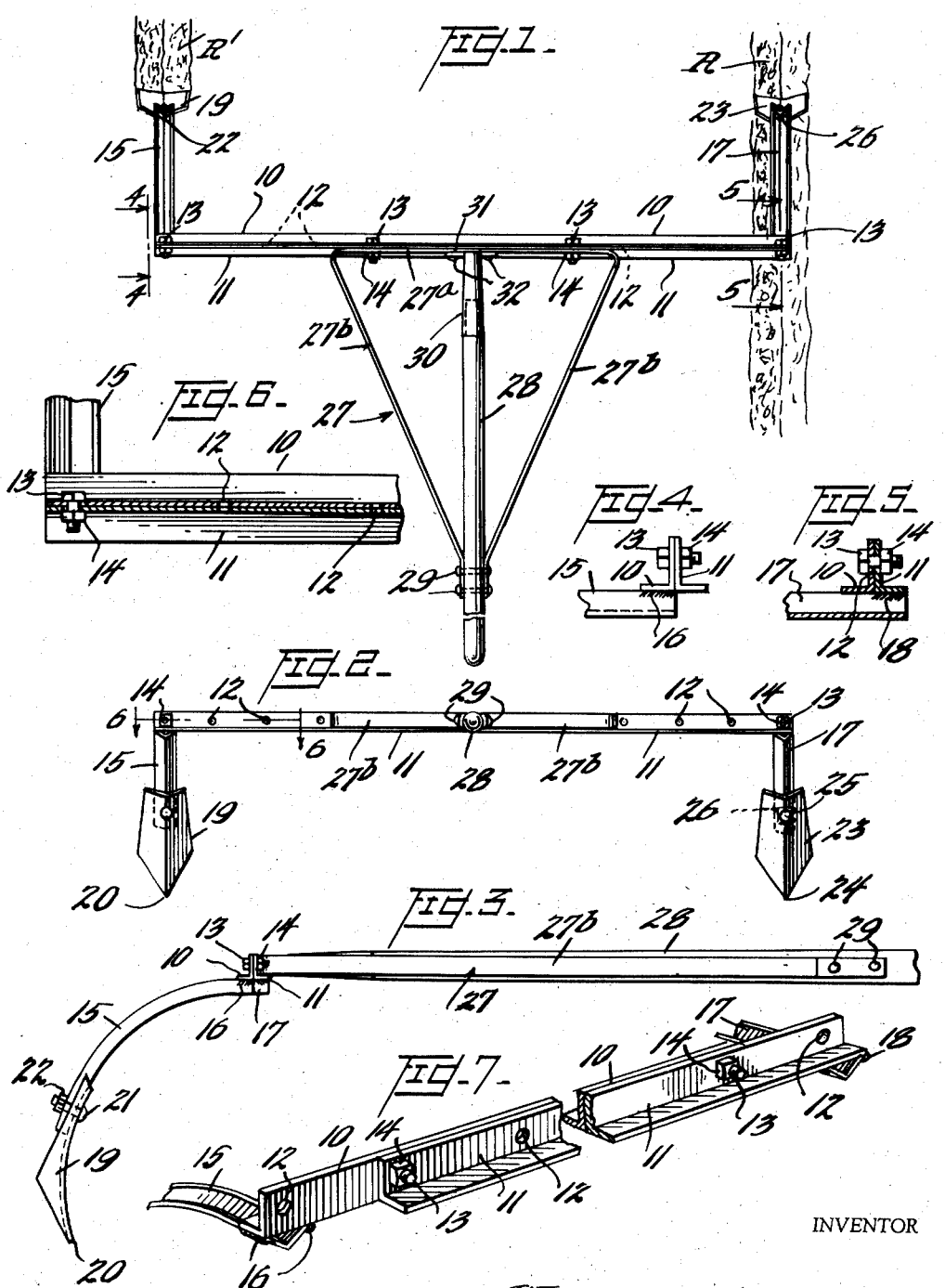
INVENTOR
Wayne W. Geiling,
BY Low & Low
ATTORNEYS Patented Sept. 1, 1953

2,650,533

UNITED STATES PATENT OFFICE 2,650,533

ROW MARKER

Wayne W. Geiling, Springfield, Ill.

Application October 16, 1951, Serial No. 251,584

1 Claim. (Cl. 97—228)

The invention relates to a garden row marker, and relates more particularly to a manually operable implement for this purpose that is readily adjustable for making parallel rows of variably spaced and uniform widths, as desired, for the planting of seeds.

It is therefore a principal object of the present invention to provide a device of the character described, which is simple in construction, capable of easy and economical manufacture, and wherein the implement is composed of a minimum number of parts.

In the embodiment hereinafter disclosed the device is of such character as to be capable of being manufactured and marketed for substantially the price of a good garden hoe or rake.

Numerous other objects and advantages of the invention will be apparent as it is better understood from the following description which, taken in connection with the accompanying drawings, discloses a preferred embodiment thereof.

In said drawings:

Fig. 1 is a plan view of the invention in a preferred embodiment.

Fig. 2 is a view in front elevation thereof.

Fig. 3 is a side elevation of the device as viewed from the left in Fig. 1, with parts broken away.

Fig. 4 is an enlarged detail view taken on line 4—4 of Fig. 1.

Fig. 5 is a similar view in transverse section, taken on line 5—5 of Fig. 1.

Fig. 6 is an enlarged horizontal sectional detail, taken on line 6—6 of Fig. 2.

Fig. 7 is a detail perspective view of a portion of the device or implement, partially broken away, and also upon a slightly enlarged scale.

Referring to the drawings the instant improved row marker and maker essentially comprises a pair of complementary angle irons or bars 10 and 11 disposed in contact or back to back relation, said bars each being provided with a series of longitudinally disposed and spaced perforations or apertures 12. Said bars are removably secured together in aligned or longitudinally offset relation by means of bolts 13 extending through said apertures and secured in place as by means of nuts 14.

A rearwardly extending downwardly curved support arm or bar 15 is secured at its inner end as by a welded connection 16 to one end of the angle bar 10, and a similar arm 17 is welded or otherwise secured at its inner end as at 18 to one end of the complementary angle bar 11. The curved rearwardly extending members 15 and 17 are preferably of V or channel shape as illustrated, in order to impart strength and rigidity to the structure, while permitting the same to be made of relatively light gauge metal or other appropriate material. A cultivator shovel or implement 19 having a pointed lower end 20 is removably secured as by a bolt or bolts 21 and nut 22 to the outer depending end of arm member 15. A similar cultivator shovel element 23 having a pointed lower end 24 is likewise secured as by a bolt or bolts 25 and nut 26 to the arm member 17 at the opposite side or end of the row marker.

A handle assembly for the marker comprises a bar or strap member 27, preferably bent into substantially triangular shape in the nature of a frame or bracket, as shown in Fig. 1. Said member includes a rearwardly disposed portion 27a designed to be removably secured as by means of certain of the aforesaid bolts 13 and nuts 14 to one or both of the assembled or united angle bars 10 and 11. Said strap member also includes integral forwardly extending inwardly inclined rigidifying or reenforcing portions 27b, which are secured at their forward extremities to a wooden or other longitudinally extending handle member 28, by means of bolt elements 29 or other suitable fastening devices. The inner end of the handle element 28 is capable of removable insertion within a hollow boss or cup member 30, the latter having a base flange 31 permanently welded or secured as at 32 to the rear portion 27a of the handle frame 27. In this manner the wooden or other handle member 28 may be readily removed or replaced when desired relative to the remaining structure of the row marker.

From the foregoing it will be apparent that the instant improved row marker and maker is or may be constructed of relatively few parts of light weight and rigid construction, which are capable of economical manufacture and convenient assembly. When so manufactured the device is further capable of ready and convenient adjustment to vary the width of the garden rows to be planted. For this purpose it is only necessary to loosen and remove the bolts 13 to permit longitudinal sliding movement of the channel members 10 and 11 relative to one another, so as to position the cultivator shovels 19 and 23 respectively mounted on said angle bars, the desired distance apart, in accordance with the dimensions and character of the garden to be planted. When so positioned the angle bars 10 and 11 are tightly secured together by means of the bolts 13 and nuts 14, as best seen in Fig. 7, and at any desired offset or extended relation to one another.

In such manner quick adjustment of the implement may be made to vary the width of the longitudinal rows or furrows F excavated by the cultivator shovels 19 and 23. This is best illustrated in Fig. 1.

Referring to Fig. 1, it will be seen that the right hand row R is made by the cultivator shovel 23 as determined by the eye, or with the aid of an indicating string, in the garden. Simultaneously row R' at the left in Fig. 1, is similarly excavated by cultivator shovel 19 at a predetermined spaced distance from row R, in accordance with the pre-spacing of the shovels on the implement as hereinabove explained. Succeeding rows are thereafter made in succession by shovel 19, or to the left as viewed in Fig. 1, or by shovel 23 when made to the right of row R in said figure.

For each succeeding row made by shovel 19 or 23 as desired, the row previously made by one of these shovels is employed as a guide or marker, and is again traversed by a said shovel, until the entire garden is laid out. For example, Fig. 1 shows a row R' being marked by shovel 19 with the aid of row R spaced therefrom, and wherein shovel 23 again traverses this row as a marker or guide indicator.

From the foregoing it will be seen that the use of the present invention provides for uniform spacing of the rows and width of the latter. Variable and different row widths, for example, 18, 24, 30, 36, 42 and 60 inches between the rows, are conveniently afforded. This is obtained by the manner of spacing the apertures 12 in the longitudinally relatively adjustable angle bars or members 10 and 11. The implement further affords an appreciable saving of time by combining the marking off and row making procedures into one operation. This as compared to separate and successive marking off and row making operations, as heretofore generally practiced in garden planting procedure.

It is thought that the invention and many of its attendant advantages will be understood from the foregoing description, and it will be apparent that various changes may be made in the form, construction and arrangements of the parts without departing from the spirit and scope of the invention or sacrificing all of its material advantages, the form hereinbefore described being merely a preferred embodiment thereof.

What is claimed is:

A row marking implement comprising a pair of adjustable angle bars, each bar having a horizontal flange and a vertical flange having spaced apertures therein, said vertical flanges being in back to back relation with certain of said apertures being in registry, bolts passing through said registered apertures for removably securing said bars together, a curved arm secured to the outer end of each bar and extending transversely rearwardly thereof, each arm being substantially V-shape in cross section and fixed to the horizontal flange of its respective bar, a shovel member secured to the rear end of each arm, a bracket member composed of a metal strip bent into substantially triangular shape and comprising an intermediate base portion and forwardly extending ends, said base portion having apertures therein spaced in accordance with the spacing of said apertures in the vertical flanges of said angle bars, said bolts serving to removably secure said base portion to said vertical flanges, a hollow boss projecting forwardly from said base portion, and an elongated operating handle extending forwardly from said bars and having an end inserted into said hollow boss, the intermediate portion of said handle being disposed between and secured to the forwardly extending ends of said bracket member, whereby said implement may be manually moved over the ground to form a pair of parallel rows of desired spacing.

WAYNE W. GEILING.

References Cited in the file of this patent

UNITED STATES PATENTS

| Number | Name | Date |
|---|---|---|
| 549,247 | Moser | Nov. 5, 1895 |
| 1,202,649 | Bellinghausen | Oct. 24, 1916 |
| 1,414,087 | Kenny | Apr. 25, 1922 |
| 1,634,421 | Hedrick | July 5, 1927 |

FOREIGN PATENTS

| Number | Country | Date |
|---|---|---|
| 611,343 | Great Britain | Oct. 28, 1948 |